July 13, 1954

R. E. DUMAS ET AL 2,683,602

FOUL DETECTING AND SIGNALING MECHANISM

Filed Jan. 28, 1950

INVENTOR
ROGER E. DUMAS
R. DOUGLAS RUMSEY
BY ALEXANDER C. WALL

Wentworth B Clapham
ATTORNEY

July 13, 1954

R. E. DUMAS ET AL 2,683,602

FOUL DETECTING AND SIGNALING MECHANISM

Filed Jan. 28, 1950

INVENTOR
ROGER E. DUMAS
R. DOUGLAS RUMSEY
BY ALEXANDER C. WALL

Wentworth B. Clapham
ATTORNEY

Patented July 13, 1954

2,683,602

UNITED STATES PATENT OFFICE 2,683,602

FOUL DETECTING AND SIGNALING MECHANISM

Roger E. Dumas, Snyder, R. Douglas Rumsey, Buffalo, and Alexander C. Wall, Snyder, N. Y., assignors to American Machine & Foundry Company, a corporation of New Jersey Application January 28, 1950, Serial No. 141,018

13 Claims. (Cl. 273—50)

This invention relates to signalling devices, and more particularly to improvements in automatic foul detecting and signalling devices for games, such as bowling, where if a player moves beyond a foul line in delivering a ball, he is penalized under the rules of the game.

The invention relates to improvements in foul detecting and signalling devices of the type in which there is provided a light beam directed from a source of light at one side of a bowling alley across the foul line to a photoelectric cell at the opposite side of the alley. Whenever a foul is made, as for example, when the foot of a bowler moves through the beam and breaks it, as he rolls a ball at bowling pins standing at the far end of the alley, the result caused by the breaking of the beam energizes the circuit controlled by the photoelectric cell and operates mechanism which indicates the occurrence of the foul. This may be a bell or a signal light, or both. Obviously, when the bell rings and/or the signal light glows, there is no doubt that a foul has been made. This automatic declaration of a foul eliminates discussions arising from the personal views of a player and possible oversights or miscalling of fouls by a foul judge and contributes materially to the orderly play of the game.

In order to insure great accuracy in the operation of the mechanism constituting the invention, the source of light employed for projecting the beam of light across and above the foul line is enclosed in a dust-tight housing and is provided with a focussing lens for concentrating and directing the light beam towards the photoelectric cell at the opposite side of the alley. The photoelectric cell housing is also dust-tight, it is shielded, and a condensing lens is provided in the housing to concentrate the light beam on the photoelectric cell cathode. The provision of this lens prevents stray ambient light from reaching the photo tube cathode and increases its accuracy of operation.

The detecting and signalling mechanism constituting our invention substantially eliminates erratic and slow foul detection due to the balancing out of A. C. pick-up on the photoelectric cell leads. We have found that any induced A. C. voltage acts as an additive or a subtractive voltage from the potential furnished by the photoelectric cell of each part of the mechanism used with a single alley and causes a change in the speed and accuracy of operation of foul detection. For example, if the induced A. C. voltage is such as to introduce an additive voltage, operation of the detecting and signalling mechanism is slowed. On the other hand, if the reverse is true, the action is too rapid and the mechanism may remain continuously in operation and signal fouls all the time. Obviously, by cancelling out such induced A. C. voltages, great accuracy in operation is obtained and also adjustments can be made to control the speed of operation of the device. Accordingly, it is an object of our invention to provide an improved foul detecting and signalling apparatus which eliminates inaccuracies in operation by balancing out A. C. pick-up on the photoelectric cell leads.

The invention also consists in the provision of improved means for so controlling the operation of the foul detecting mechanism that the occurrence of a foul will be signalled any time the light beam is broken, except that time delay means is provided in order that the delivery of a ball will not cause the declaraton of a foul. This result is obtained by providing means for adjusting the rate of change of voltage across the photoelectric cell. In the preferred embodiment, three adjustments are provided, i. e. a high speed, a low speed and an intermediate or medium speed response. The adjusting mechanism is located at the foul line which makes it readily accessible for easy adjustment without the necessity of making changes in the control box at the rear of the alley or elsewhere.

The invention further consists in the provision of novel timing mechanism for effecting the controlled operation of audible and visible foul signalling devices for predetermined time intervals.

It is a further object of the invention to provide a simple foul detecting and signalling apparatus which includes common units operative in detecting and signalling fouls occurring on two or more adjoining bowling alleys.

Other objects and advantages will be apparent from the following detailed description of a preferred embodiment of our invention, reference being made to the accompanying drawings which form a part of this specification and in which like characters of reference indicate the same or like parts:

Figure 1:
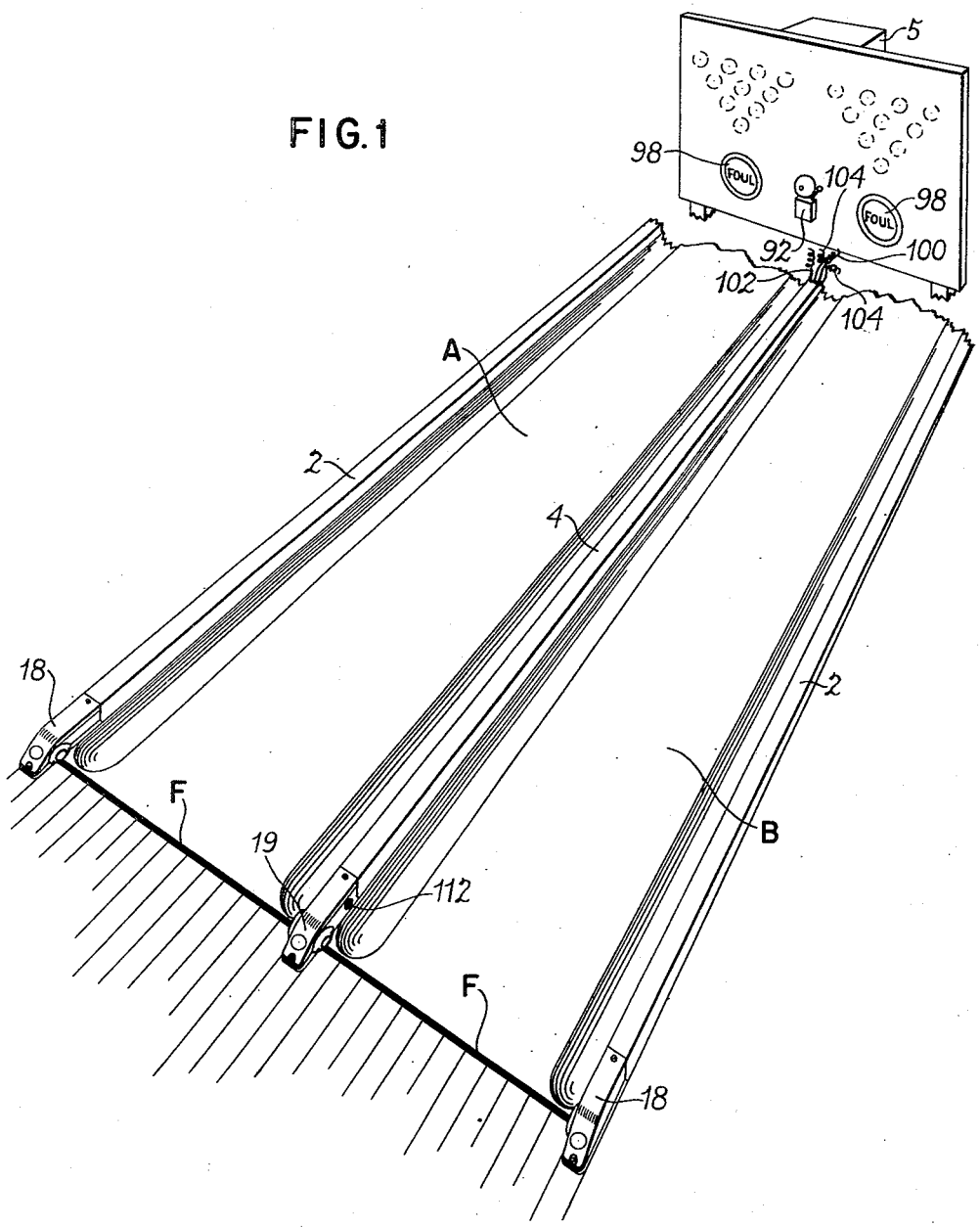
Figure 1 is a perspective view illustrating two adjoining bowling alleys equipped with the detecting and signalling apparatus constituting the invention.

The detecting and signalling apparatus constituting the invention can be used with a single alley or with a plurality of alleys, as desired. In the preferred embodiment selected for purposes of illustration, the invention is shown operatively associated with two side by side alleys A and B. The mechanism includes a visible signal, such as a foul light 98, for each alley and an audible signal common to both alleys, such as a conventional electric bell 92. Our mechanism is simpler than devices of this type heretofore known because of the fact that the major part of the operating elements for two alleys, or for a plurality of alleys when more than two alleys are involved, is enclosed in a small cabinet 5 located at a suitable position, preferably at the rear of the alley where it cannot be seen or disturbed. The separate light beam and photoelectric cell units 18 and 19, respectively, as shown in Figure 1, replace the ends of alley division guards 2 and 4, respectively, at the foul lines. However, these units may be mounted at the foul line in any other suitable manner. Unit 19, illustrated in Figure 1, contains two photoelectric cells 68, each of which receives a beam of light from a lamp 17 mounted in a light source unit 18.

The beam of light from lamp 17 is directed across the alley a suitable distance above the foul line F, so that when a foul is made, as when the foot of a bowler breaks the beam, the detecting and signalling mechanism is set into operation and the occurrence of a foul is made known substantially at once visibly and/or audibly.

Photoelectric cell devices used in the open suffer from at least two rather serious setbacks. One of these is inadvertent exposure to light levels of high foot candle intensity which tend to change the characteristics of the photoelectric cell and render it unsuitable for long and accurate use in our detecting and signalling apparatus where such qualities are required. Also high ambient or stray light can greatly affect the trigger or operating point of a system. If the ambient light level is sufficiently high, the system may not trigger or operate at all when the beam from the light source is broken. In the present invention this might result in failure of our apparatus to declare a foul or a very slow declaration thereof. In order to overcome these difficulties, we employ a masked photoelectric cell and a short focal length condensing lens. It is also preferred to use a colored beam, such as a red beam, which not only is used satisfactorily in the operation of our apparatus, but also provides a visible warning to a bowler as he is about to deliver a ball.

Figure 2:
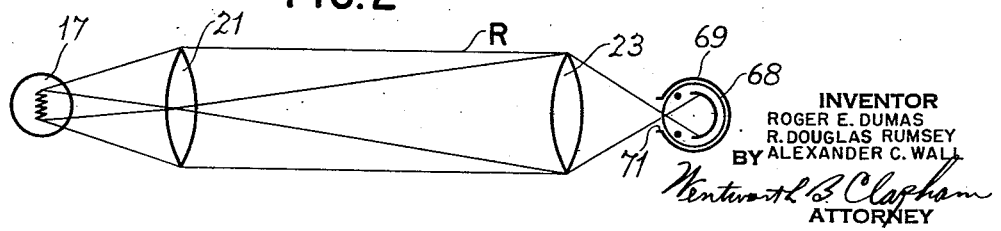
Figure 2 is a diagram showing the manner in which the light beam is transmitted to the photoelectric cell.

A suitable lens system is shown diagrammatically in Figure 2. Light from lamp 17 is passed through a red glass lens 21 to short focal length condensing lens 23 which focuses the beam on the cathode of photoelectric cell 68. A silvered mask or shield 69 encircling photoelectric cell 68 has an aperture 71 through which the focused beam of light may enter photoelectric cell 68. By means of this arrangement, practically no light other than that in the substantially parallel ray beam R, can pass through condensing lens 23 as well as through aperture 71 in shield 69. Substantially all the light which enters aperture 71 in light shield 69 will either strike the cathode of photoelectric cell 68 directly, or be reflected back to the cathode by the inside of light shield 69.

Figure 3:
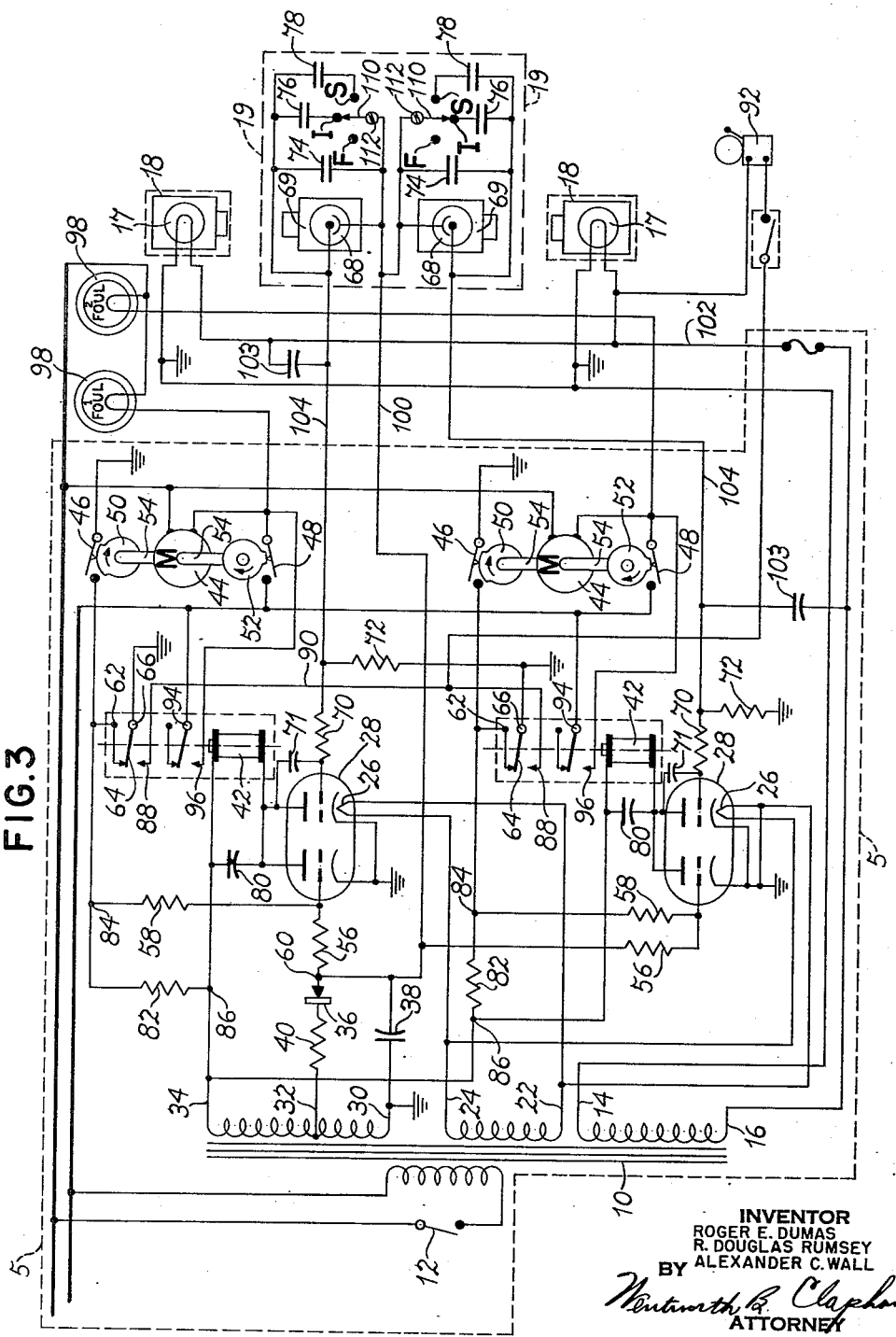
Figure 3 is a wiring diagram of the electrical elements of our apparatus connected in a suitable operating circuit for the detecting and signalling apparatus.

Figure 3 shows diagrammatically a preferred construction and operating circuit of our detecting and signalling apparatus. In the description, any voltages and currents indicated are exemplary, it being understood that other voltages and currents could be used with suitable changes in elements forming a part of the circuit. As illustrated in this figure, power such as 117 volt, 60 cycle, A. C. current is supplied to the primary winding of transformer 10 through switch 12. Transformer 10 has three secondary windings. One, composed of leads 14 and 16, supplies a suitable potential for operation of the light source lamp 17 in each of the light source units 18.

The second secondary winding of transformer 10, composed of leads 22 and 24, supplies a voltage sufficient for operation of the filaments or heaters 26 of two tubes 28 type 6SN7GT used in the control mechanism.

The third secondary winding of transformer 10, composed of leads 30, 32 and 34, is used to supply a voltage between leads 30 and 34 for the plate circuit of the two control tubes 28, and a lower voltage between leads 30 and 32 furnishing power to a suitable rectifier 36 which rectifies the A.-C. voltage to pulsating D. C. voltage which in turn is smoothed by capacitor 38 to furnish negative D. C. power with respect to ground for operation of the photoelectric cell circuit. A resistor 40 is provided to assist in smoothing the pulsating D. C. voltage and to limit the current in the respective photoelectric cell circuits to a harmless value in the case of a short circuit. For each of the two alleys illustrated, the control box contains one tube 28 of type 6SN7GT which is a double, medium mutual conductance, triode type. Obviously two suitable separate triode type tubes could also be used. It also contains one relay 42 equipped with double pole, double throw contacts and a suitable timing motor 44, such as a 117 volt, 60 cycle, 5 R. P. M. output shaft speed, synchronous type and a switch or reset contact 46, and a switch 48 operated by cams 50 and 52, respectively. These cams are mounted on shaft 54 of timing motor 44.

Control cabinet 5 for the two alleys has two sets of the above mentioned components and one common power supply.

The operation of the control circuit of the detecting and signalling device is as follows: Both plates of tube 28 are connected to the coil of relay 42; both cathodes are connected to ground. A suitable potential of say 240 volts A. C., is connected across tube 28 through the coil of relay 42 (between cathode and plate). However, both grids of tube 28 are negatively biased (a negative voltage—with respect to the cathode—is applied) preventing plate current flow. The bias for the left hand section, as viewed in Figure 3, is derived from the voltage divider consisting of two resistors 56 and 58 connected between terminal 60 of rectifier 36 (which is negative with respect to ground) and terminal 62 of relay 42 which is grounded through its movable arm 64 to pivot point 66 when relay 42 is de-energized. Hence the midpoint connection of resistors 56 and 58, which is connected to the grid, will be at a potential of approximately one-half of the negative voltage of the photoelectric cell power supply. The right section of tube 28, as viewed in Figure 3, has its grid connected to photoelectric cell 68 (type 927) through resistor 70. The type 927 photoelectric cell is coated with a photo-sensitive material of the type customarily referred to as an S-1 characteristic. This characteristic is a curve of the response of the photocell as a function of the wave-length or color of the received light. An S-1 characteristic has its maximum response values for light in the spectrum in the red region. (See RCA tube handbook, vol. 1-2, Sheet 92CM-6056R5, dated March 18, 1946.) Photoelectric cell 68 and a resistor 72 are connected in series across power supply 100 furnished by rectifier 36. Photocell 68 is connected for negative operation, i. e. the cathode is connected to terminal 60 of rectifier 36 and the anode is connected to resistor 72, the opposite side of which is connected to ground. The junction between photocell 68 and resistor 72 is also connected through resistor 70 to the grid of the right hand section of tube 28. When light is impressed upon photocell 68, the latter will pass electrons from cathode to anode and this current flowing through resistor 72 will result in a voltage being developed across the resistor, making the grid negative with respect to the cathode for the right hand section of the tube.

A large amount of light will produce a heavy current, relatively speaking, and a large voltage drop across resistor 72. A small amount of light or no light produces little or no current and hence a small or no voltage drop across resistor 72. With no voltage across resistor 72, the grid will approach the cathode potential and plate current will flow in the right-hand section of tube 28 during the one-half cycle of the A. C. voltage when the plate is positive with respect to the cathode. Capacitors 74, 76 and 78 which in the illustrated embodiment are of 1500, 2000 and 4000 micromicrofarads capacity, respectively, are located in unit 19 and are connected across the photoelectric cell, to restrain the rate of change in voltage across photoelectric cell 68, which can be considered as a light controlled, variable resistance, and, as a consequence, reduce the rate of change in grid potential or voltage drop across resistor 72. Hence the light beam interruption required to reduce the grid potential to the point where the tube 28 will conduct, depends upon the value of the capacitor connected across photocell 68. This restraining effect is due to the fact that the capacitor requires electrons to charge to a different potential so that the electrons which would normally flow through phototube 68, are stored on the capacitor when the resistance of the photoelectric cell is suddenly increased by the interruption of the light beam with a corresponding reduction in the current through the photoelectric cell. The electrons, which are stored on the capacitor, flow through the resistor 72 so that temporarily the current through the resistor does not change at the same rate as the current through photoelectric cell 68. Hence the voltage drop across resistor 72 does not follow the rate of light change. After the capacitor is charged to the new value of voltage across the photoelectric cell, the current in the resistor 72 will decrease until equilibrium is again reached where the current through the photocell 68 and through the resistor 72 are the same. As the grid potential of the right hand section of the tube 28, see Figure 3, is reduced to a value approaching that of the cathode, plate current will flow in this section of tube 28 during the time that the A.-C. voltage between the plate and cathode is positive with respect to ground. This current flows through the coil of relay 42 causing it to close. A capacitor 80 is connected across the relay coil which stores electrons during the positive cycles and releases electrons through the coil during the negative cycles of the A.-C. voltage across the plate circuit. This arrangement maintains the current through the coil of relay 42 during the time the A.-C. plate voltage is negative, and prevents relay 42 from chattering.

The upper contact on relay 42 between terminal 62 and point 66 is broken when relay 42 is energized which removes the ground from resistor 82 connected to junction point 84. There is now connected a voltage divider consisting of three equal resistors 56, 58 and 82 between junction point 86, which is positive with respect to ground, and junction point 60 which is negative with respect to ground. When the A. C. voltage is positive on the plate of the left hand section of the tube 28, the grid of this section of the tube, which is connected to the junction of resistors 56 and 58, is at a potential of one third of the potential between point 60 which is negative, and point 86 which is positive. This potential at the junction of resistors 56 and 58 is positive with respect to ground when junction point 84 is not grounded, thus applying a positive voltage to the grid of the left hand section of tube 28, which makes it draw plate current, thus maintaining the flow of current through relay 42 irrespective of what happens in the photoelectric cell amplifier section of said tube. This in effect locks in relay 42. Closing of the contact between points 66 and 88 by energizing relay 42 applies power to the bell circuit by grounding wire 90. The other side of the bell circuit is connected to the first transformer winding, the other side of this winding being connected to ground. Thus grounding of wire 90 completes the circuit to bell 92, and applies power to the bell causing it to operate.

The energization of relay 42 also closes contacts 94 and 96 which apply power to timing motor 44 causing it to operate. Switch 48 is closed substantially immediately after motor 44 starts. Motor 44 remains energized for a full revolution of shaft 54 regardless of whether or not relay 42 remains energized. Also because of the closing of contacts 94 and 96, foul light 98 is energized and remains so until the high portion of cam 52 engages and opens switch 48.

After switch 48 closes, switch or reset contact 46, which is controlled by cam 50, also closes. The closing of the latter preferably occurs about two seconds after the motor has started and establishes a ground connection to junction point 84 of the voltage divider network, re-establishing the original conditions in this network and providing a negative bias of 30 to 40 volts on the left hand section of tube 28. This bias interrupts the plate current flow in tube 28 and de-energizes relay 42 which stops the foul bell 92 by opening contacts 66 and 88.

The cam switch 48 is held closed until the end of one revolution of shaft 54 of motor 44 at which time switch 48 is opened by the high spot on cam 52 which in turn effects a stopping of motor 44. Motor 44 is equipped with a suitable brake (not shown) to prevent overrun. The circuit to the foul light 98 is opened at the same time and the light is extinguished.

A second set of components operating in the same manner is provided for the second alley. Since these components are of the same type and construction as those mentioned and described above, further detailed description is considered unnecessary. The corresponding components of the second set carry the same reference characters as those in the first set described hereinabove.

A common photoelectric cell voltage supply line 100, and a common light source and bell circuit line 102 are provided.

The first secondary winding of the transformer having terminals 14 and 16 is grounded such that the phasing between the plate circuit secondary winding having terminals 34 and 36 and the first secondary winding will produce an additive potential between the leads 34 and 16 when the A. C. voltage at line 34 is positive to ground. The lead 16 then will be negative to ground. This is the period when tube 28 will conduct if the foul line is tripped. It will be noted that the leads 100, 102 and 104 are long leads since they extend along division guard 4 from the rear of the alley to units 18 and 19. We prefer to use conductors with a high resistance insulation, such as polyethylene covered wire. This type of lead has low dielectric losses and low moisture absorption.

Lead 102 runs to the light source at the end of the alley. The proximity of this lead to the photoelectric cell grid wires 104 induces a potential in the photoelectric cell wire through capacitative and inductive coupling. All lead wires including wires 100, 102 and 104 are enclosed in division guard 4. Lead wire 102 also extends transversely beneath an alley to the other unit 18. There is also a capacitative coupling between the plate and the grid of tube 28 due to the capacity between these two elements, which also induces a potential on the grid of the tube and therefore affects the calibration of the response speed of the photocell unit. We have found that this condition can be overcome and substantially eliminated by phasing out such capacitative couplings. Shielding is unsuitable as a remedy because shields induce leaks to ground and also add additional capacity to the circuit, which reduces the response speed of the circuit such that it is unsuitable for use in a foul detector.

The amount of induced or coupled voltage or E. M. F. for these two cases is approximately the same. By arranging the phase of the first secondary winding, these two effects may be used to cancel each other, leaving the grid of the tube 28 at the same potential as the photoelectric cell even though these two units are separated by a large distance. This procedure of arranging the phase of the first secondary winding is important because it eliminates the adverse effects of these two coupled voltages which otherwise would either lower or raise the operating or conducting point of the tube 28 in relation to the photoelectric cell voltage. This would result in a reduction or increase in the response speed of the circuit and adversely affect the calibration of response speed of the unit to duration of interruption of light and the unit might trip on thrown balls. Under some conditions it may be desirable in order to control the cancelling potentials to use a capacitor 71 between the plate and grid of the right-hand section of double triode tube 28, as seen in Figure 3, and a capacitor 103 between leads 102 and 104.

The response speed of the photocell and its associated circuit is adjusted by a movable contact arm 110 so that the interruption of the light beam from light source 18 to photoelectric cell 68 by a bowled ball will not energize the foul detector. However, interruption for a longer period of time, such as that caused by the toe of a bowler's shoe, will energize the foul detector. Three response speeds are provided so that if arm 110 is brought in engagement with contact F, the light beam interruption is set for a fast ball. When brought in engagement with contact I, the light beam interruption is set for a ball of medium or intermediate speed and if arm 110 is brought in engagement with contact S, the light beam interruption is set for a slow ball. The adjustment or setting of contact arm 110 is accomplished by turning a slotted screw 112 (Figure 1) clockwise or anti-clockwise. This screw projects from said contact arm through the outer shell of the photoelectric cell unit 19.

The invention above described may be varied in construction within the scope of the claims, for the particular device, selected to illustrate the invention, is but one of many possible concrete embodiments of the same. It is not, therefore, to be restricted to the precise details of the structure shown and described.

What we claim is:

1. An automatic foul detecting and signalling device for use with a bowling alley comprising a visible signal, an audible signal, a source of light at one end of the foul line of said alley for projecting a beam of light across said alley above said foul line, a photoelectric cell mounted at the opposite end of said foul line positioned to receive said beam of light, electrical mechanism actuated in response to the application of a predetermined potential for operating said visible and audible signals, said photoelectric cell being connected to said mechanism and to a source of potential in such manner as to apply said predetermined potential to said mechanism in response to the total change in the resistance of said photoelectric cell resulting from the interruption of said light beam, said mechanism including means for maintaining said visible signal in operation a predetermined period of time, and means for maintaining said audible signal in operation for a shorter period of time, mechanism for adjusting the operation of said photoelectric cell to control the lapse of time subsequent to the breaking of said beam of light in actuating said signals, said last-named mechanism consisting of a plurality of capacitors, and means for selectively connecting one or more of said capacitors across said photoelectric cell to vary the rate of change of potential applied to said electrical mechanism.

2. In an automatic foul detecting and signalling device, photoelectric means for detecting the occurrence of a foul, said means including a housing mounted adjacent one end of a bowling alley foul line, a photoelectric cell mounted in said housing, a housing mounted adjacent the opposite end of said foul line, a light source in said last-named housing projecting a beam of light across and above said foul line, electrical mechanism operated in response to the application of a predetermined potential for actuating said device, said photoelectric cell being connected to said mechanism and to a source of potential in such manner as to apply said predetermined potential to said mechanism in response to the total change in the resistance of said photoelectric cell resulting from the interruption of said light beam, said mechanism including means for maintaining said device in operation for a predetermined period of time, means for adjusting the operation of said photoelectric cell to respond to a predetermined duration of the interruption of said beam of light whereby the operation of said mechanism is prevented because of the passage of a ball only through said beam, said last-named means consisting of a plurality of capacitors of different capacity, and means for selectively connecting one or more of said capacitors across said photoelectric cell to restrain the rate of change in voltage across said photoelectric cell and vary the rate of change of potential applied to said electrical mechanism.

3. An automatic foul detecting and signalling device for use with a plurality of bowling alleys comprising a visible signal for each alley, a common audible signal, a source of light at one end of the foul line of each of said alleys for projecting a warning beam of colored light across the alley closely adjacent said foul line, a photoelectric cell mounted at the opposite end of the foul line of each alley positioned to receive said beam of light, and mechanism actuated by a photoelectric cell when a foul is made on the alley with which said cell is associated for actuating said visible signal for said alley and said audible signal, said mechanism comprising a relay having a coil, a relay circuit including said coil and a double triode tube, said coil of said relay being a common element in the plate circuits of both sections of said double triode, means for causing one of said sections of said double triode tube to conduct plate current in response to the interruption of said beam of light for a period in excess of a predetermined time, and energize said relay, and a circuit comprising a voltage source, a reset contact, a resistance network and a normally closed contact on said relay responsive to the operation of said relay by said first-named section of said double triode to cause said other section of said double triode to conduct plate current thereby holding energized said relay for a period of time until closing of said reset contact; a circuit containing a normally open contact on said relay adapted to supply electric power to said audible signal, timing means actuated by said relay for operating said visible signal of said last-named alley, means including said reset contact operated by said timing means for deenergizing said relay and stopping the operation of said common audible signal, and means operative by said timing means after the deenergization of said relay for continuing the operation of said visible signal for a predetermined period of time.

4. An automatic foul detecting and signalling device for use with a bowling alley comprising a visible signal, a source of light at one end of the foul line of said alley for projecting a beam of light across said alley above said foul line, a photoelectric cell mounted at the opposite end of said foul line positioned to receive said beam of light, and mechanism actuated by said photoelectric cell when a foul is made for actuating said visible signal, said mechanism including a relay circuit comprising two triodes, a relay in the plate circuit of both of said triodes, means including said photoelectric cell for energizing one of said triodes and said relay, means operated by said relay to energize the other of said triodes to maintain said relay energized, a motor, contacts on said relay operative in response to the energization of said relay for actuating said visible signal, and said motor, means operated by said motor for providing a negative bias on said last-named triode for deenergizing said relay, and means operative by said motor, for continuing operation of said motor and said visible signal for a predetermined period of time after deenergization of said relay.

5. A foul detecting and signalling device for use with a bowling alley comprising a visible signal, an audible signal, a source of light at one end of the foul line of said alley for projecting a beam of light across said alley above said foul line, a photoelectric cell mounted on the opposite end of said foul line positioned to receive said beam of light, and mechanism actuated by said photoelectric cell when a foul is made for actuating said visible and audible signals, operating circuits for said signals, said mechanism including a relay circuit comprising two triodes, a relay, the coil of said relay being a common circuit element of the plate circuits of said triodes, means including said photoelectric cell for energizing one of said triodes to actuate said relay, means including a set of normally closed contacts on said relay to energize the other of said triodes by removing a negative bias voltage on the grid of said other triode to maintain said relay energized, means including normally open sets of contacts on said relay operative in response to the energization of said relay for actuating said circuits of said visible signal and said audible signal, a motor in said visible signal circuit operative in response to the energization of said relay, a motor shaft on said motor, cams on said motor shaft, a switch operative in response to the rotation of one of said cams for closing a circuit to restore negative bias to said other triode, and deenergize said relay and incapacitate said audible signal, a second cam on said motor shaft, a second switch operated by said second cam connected to continue energization of said visible signal circuit and said motor for a predetermined period of time after said relay is deenergized, and to open said visible signal circuit upon conclusion of said predetermined period of time thereby incapacitating said visible signal and stopping said motor.

6. A foul detecting and signalling device for use with a bowling alley comprising a visible signal, an audible signal, a source of light at one end of the foul line of said alley for projecting a beam of light across said alley above said foul line, a photoelectric cell mounted on the opposite end of said foul line positioned to receive said beam of light, and mechanism actuated by said photoelectric cell when a foul is made for actuating said visible and audible signals, said mechanism including a relay circuit comprising two triodes, a relay, the coil of said relay being a common circuit element of the plate circuits of said triodes, means including said photoelectric cell for energizing one of said triodes to actuate said relay, means including a set of normally closed contacts on said relay to energize the other of said triodes by removing a negative bias voltage on the grid of said other triode and maintain said relay energized, means including normally open sets of contacts on said relay to energize circuits to said visible signal and said audible signal, a motor in said visible signal circuit set into operation by said relay operation, a motor shaft on said motor, cams on said motor shaft, a switch operated by one of said cams and connected in a circuit to restore negative bias to said other triode, and deenergize said relay and incapacitate said audible signal, a second cam on said motor shaft, a second switch operated by said second cam connected to continue energization of said visible signal circuit and said motor for a predetermined period of time after said relay is de-energized, and to open said visible signal circuit upon conclusion of said predetermined period of time, thereby incapacitating said visible signal and stopping said motor, and means for compensating for the effects of induced alternating current voltage in the grid circuit of said first-named triode due to the proximity of the lead wire connecting said photoelectric cell and the grid of said first-named triode to the leads furnishing power for said source of light, including a capacitor connecting the plate of said first-named triode to said grid and the proper phasing of the A. C. potential applied to the plate circuit of said first-named triode with respect to the phasing of the lead wires supplying power to said light source.

7. In an automatic foul detecting and signalling device for use with a plurality of bowling alleys, a visible signal for each alley, a common audible signal, a source of light at one end of the foul line of each of said alleys for projecting a warning beam of colored light across the alley closely adjacent said foul line, a photoelectric cell mounted at the opposite end of the foul line of each alley positioned to receive said beam of light, and mechanism actuated by a photoelectric cell when a foul is made on the alley with which said cell is associated for actuating said visible and audible signals, said mechanism comprising two triodes, a relay connected to the plates of each of said triodes, means including said photoelectric cell for energizing one of said triodes to actuate said relay, means for energizing the other of said triodes including a circuit comprising a voltage source, a reset switch, a resistance network and a normally closed set of contacts on said relay responsive to the operation of said relay by said first triode to cause the other triode to conduct plate current, thereby holding energized said relay for a period of time until said reset switch is operated, a circuit containing a normally open set of contacts on said relay adapted to supply electric power to said audible signal, means for operating said reset switch thereby releasing said relay and incapacitating said audible signal, and means operative after the deenergizing of said relay for continuing the operation of said visible signal, a common source of power, including a transformer, having a primary winding, a first secondary winding in said transformer having one lead connected to the grid of one of said triodes, and its other lead grounded, a second secondary winding in said transformer having one lead connected to said source of light and its other lead grounded, and means associating said windings in said transformer such that when one of said ungrounded leads is positive, the other is negative and 180° out of phase, whereby capacitative coupling between said ungrounded leads is substantially eliminated.

8. An automatic foul detecting and signalling apparatus for use with a plurality of side by side bowling alleys comprising a visible signal for each alley, a common audible signal for said plurality of alleys, a light source at one end of the foul line of each of said alleys for projecting a beam of light across the alley adjacent said foul line, a photoelectric cell located adjacent the opposite end of each of said foul lines positioned to receive said beam of light from a source of light, a main operating circuit, a plurality of relay sub-circuits for actuating the visible signals of said alleys connected in said operating circuit and operating connections associating said common audible signal with each of said relay sub-circuits, two triodes in each of said relay sub-circuits, a relay connected to both of said triodes in each of said relay sub-circuits, means actuated by a photoelectric cell when a foul is made on the alley with which said cell is associated for energizing one of said triodes connected to said relay to actuate said relay, means operated by said relay to energize said other triode to lock in said relay for maintaining said audible signal in operation for a predetermined period of time, means including a motor actuated by said relay for operating said visible signal, means operated by said last-named means for providing a negative bias on said other triode for de-energizing said relay and incapacitating said audible signal, and means operative after the de-energization of said relay for continuing the operation of said visible signal for a substantially constant predetermined period of time.

9. An automatic foul detecting and signalling device for use with a bowling alley comprising a visible signal, an audible signal, a source of light at one end of the foul line of said alley for projecting a beam of light across said alley above said foul line, a photoelectric cell mounted at the opposite end of said foul line positioned to receive said beam of light, and mechanism actuated by said photoelectric cell when a foul is made for actuating said visible and audible signals, said mechanism comprising a relay having a coil, a relay circuit including said coil and a double triode, said coil of said relay being a common element in the plate circuits of both sections of said double triode, means for causing one of the sections of said double triode to conduct plate current in response to the interruption of said beam of light and energize said relay, a circuit comprising a voltage source, a reset switch with normally open contacts, a resistance network and normally closed contacts on said relay responsive to the operation of said relay by said first-named section of said double triode to cause said other section of said double triode to conduct plate current thereby holding energized said relay for a period of time until said reset switch is operated, a circuit containing normally open contacts on said relay adapted to be closed in response to the energization of said relay to supply electric power to said audible signal, means for operating said reset switch to close said normally open contacts thereby releasing said relay and incapacitating said audible signal, and means operative after the de-energization of said relay for continuing the operation of said visible signal.

10. An automatic foul detecting and signalling device for use with a bowling alley comprising a visible signal, an audible signal, a source of light at one end of the foul line of said alley for projecting a beam of light across said alley above said foul line, a photoelectric cell mounted at the opposite end of said foul line positioned to receive said beam of light, and mechanism actuated by said photoelectric cell when a foul is made for actuating said visible and audible signals, said mechanism including a relay circuit comprising a double triode, a relay in the plate circuits of both sections of said double triode, means operative in response to the interruption of said light beam for causing one of the sections of said double triode to conduct plate current and energize said relay, normally open contacts on said relay to energize said visible signal, a motor circuit including a voltage source, a motor in said circuit, a motor shaft driven by said motor, normally open contacts on said relay to energize said audible signal and said motor, means operative in response to the energization of said relay for energizing the other section of said double triode for maintaining said relay energized, means for deenergizing said relay including a cam switch, a cam on said motor shaft operative in response to the rotation of said shaft for operating said cam switch, thereby deenergizing said relay and incapacitating said audible signal, an auxiliary motor circuit, a second cam on said shaft, means including a second cam switch operated by said second cam in response to the rotation of said shaft for closing said auxiliary motor circuit and an auxiliary energizing circuit for said visible signal prior to deenergization of said relay, thereby continuing the operation of said motor and said visible signal when the relay is de-energized, and driving said shaft through a single revolution, said second cam switch upon completion of a single revolution being operated by said second cam to break said auxiliary motor circuit and stop said motor and de-energize said visible signal.

11. An automatic foul detecting and signalling device for use with a plurality of bowling alleys comprising a visible signal for each alley, a common audible signal, a source of light at one end of the foul line of each of said alleys for projecting a warning beam of colored light across the alley closely adjacent said foul line, a photoelectric cell mounted at the opposite end of the foul line of each alley positioned to receive said beam of light, and mechanism actuated by a photoelectric cell when a foul is made on the alley with which said cell is associated for actuating said visible signal for said alley and said audible signal, said mechanism comprising a relay having a coil, a relay circuit including said coil and two electronic valves, said coil of said relay being a common element in the anode circuits of said two valves, means for causing one of said electronic valves to conduct current in response to the interruption of said beam of light for a period in excess of a predetermined time, and energize said relay, and a circuit comprising a voltage source, a reset contact, a resistance network and a normally closed contact on said relay responsive to the operation of said relay by said first-named electronic valve to cause the other electronic valve to conduct current thereby holding energized said relay for a period of time until opening of said reset contact; a circuit containing a normally open contact on said relay adapted to supply electric power to said audible signal, timing means actuated by said relay for operating said visible signal of said last-named alley, means including said reset contact operated by said timing means for deenergizing said relay and stopping the operation of said common audible signal, and means operative by said timing means after the de-energization of said relay for continuing the operation of said visible signal for a predetermined period of time.

12. An automatic foul detecting and signalling device for use with a bowling alley comprising a visible signal, a source of light at one end of the foul line of said alley for projecting a beam of light across said alley above said foul line, a photoelectric cell mounted at the opposite end of said foul line positioned to receive said beam of light, and mechanism actuated by said photoelectric cell when a foul is made for actuating said visible signal, said mechanism including a relay circuit including two electronic valves, a relay in the anode circuit of both of said valves, means including said photoelectric cell for energizing one of said valves and said relay, means operated by said relay to energize the other of said valves to maintain said relay energized, a motor, contacts on said relay operative in response to the energization of said relay for actuating said visible signal, and said motor, means operated by said motor for providing a negative bias on said last-named valve for deenergizing said relay, and means operative by said motor for continuing operation of said motor and said visible signal for a predetermined period of time after de-energization of said relay.

13. An automatic foul detecting and signalling apparatus for use with a plurality of side by side bowling alleys comprising a visible signal for each alley, a common audible signal for said plurality of alleys, a light source at one end of the foul line of each of said alleys for projecting a beam of light across the alley adjacent said foul line, a photoelectric cell located adjacent the opposite end of each of said foul lines positioned to receive said beam of light from a source of light, a main operating circuit, a plurality of relay sub-circuits for actuating the visible signals of said alleys connected in said operating circuit and operating connections associating said common audible signal with each of said relay sub-circuits, two electronic valves in each of said relay sub-circuits, a relay connected to both of said valves in each of said relay sub-circuits, means actuated by a photo-electric cell when a foul is made on the alley with which said cell is associated for energizing one of said valves connected to said relay to actuate said relay, means operated by said relay to energize said other valve to lock in said relay for maintaining said audible signal in operation for a predetermined period of time, means including a motor actuated by said relay for operating said visible signal, means operated by said last-named means for biasing said other valve for de-energizing said relay and incapacitating said audible signal, and means operative after the de-energization of said relay for continuing the operation of said visible signal for a substantially constant predetermined period of time.

References Cited in the file of this patent

UNITED STATES PATENTS

| Number | Name | Date |
| --- | --- | --- |
| 1,731,182 | Streeter | Oct. 8, 1929 |
| 1,958,631 | Logan | May 15, 1934 |
| 2,037,671 | Yannes | Apr. 14, 1936 |
| 2,425,257 | MacLagan et al. | Aug. 5, 1947 |